US012632648B2

(12) United States Patent
Ferenczi

(10) Patent No.: US 12,632,648 B2
(45) Date of Patent: May 19, 2026

(54) GENERATIVE LARGE LANGUAGE MODEL (LLM) DECENTRALIZED NETWORK

(71) Applicant: American Express Travel Related Services Company, Inc., New York, NY (US)

(72) Inventor: Andras L. Ferenczi, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 288 days.

(21) Appl. No.: 18/375,794

(22) Filed: Oct. 2, 2023

(65) Prior Publication Data

US 2025/0111141 A1    Apr. 3, 2025

(51) Int. Cl.
*G06F 40/20*          (2020.01)

(52) U.S. Cl.
CPC .................................... *G06F 40/20* (2020.01)

(58) Field of Classification Search
CPC ....................................................... G06F 40/20
See application file for complete search history.

(56) References Cited

U.S. PATENT DOCUMENTS

| | | | | |
|---|---|---|---|---|
| 10,978,056 B1 * | 4/2021 | Challa | .................... | G06N 5/025 |
| 2018/0069923 A1 * | 3/2018 | Tsalmon | ........... | G06F 15/17331 |
| 2021/0374168 A1 * | 12/2021 | Srinivasan | ............. | G06V 10/82 |
| 2022/0284428 A1 * | 9/2022 | Zhou | ....................... | G06Q 20/40 |
| 2023/0379155 A1 * | 11/2023 | Xue | ......................... | G06F 21/64 |
| 2024/0126911 A1 * | 4/2024 | Vora | .................... | G06F 21/6227 |
| 2025/0021767 A1 * | 1/2025 | Dharnidharka | ... | G06F 16/90332 |
| 2025/0086647 A1 * | 3/2025 | Gao | ..................... | G06Q 30/015 |

* cited by examiner

*Primary Examiner* — Daniel C Washburn

*Assistant Examiner* — Paul J. Mueller

(74) *Attorney, Agent, or Firm* — Thomas | Horstemeyer, LLP

(57)                    ABSTRACT

Disclosed are various embodiments for minimizing hallucination-based responses by verifying or otherwise identifying one or more accurate responses generated by multiple large language model (LLM) service providers to a prompt through the use of a decentralized network. LLM service providers can be part of a decentralized network that allows multiple LLM service providers to receive a prompt. Each LLM service provider in the network can generate a response to the prompt by applying the prompt to one or more LLM models associated with the LLM service. Once a response has been formulated, the LLM service provider can transmit the response in a decentralized data storage for storage. In various examples, a threshold number of stored responses can be compared to one other to determine a level of similarity between responses and to identify any response that may correspond to a hallucination and, therefore, an inaccurate response.

20 Claims, 7 Drawing Sheets

200

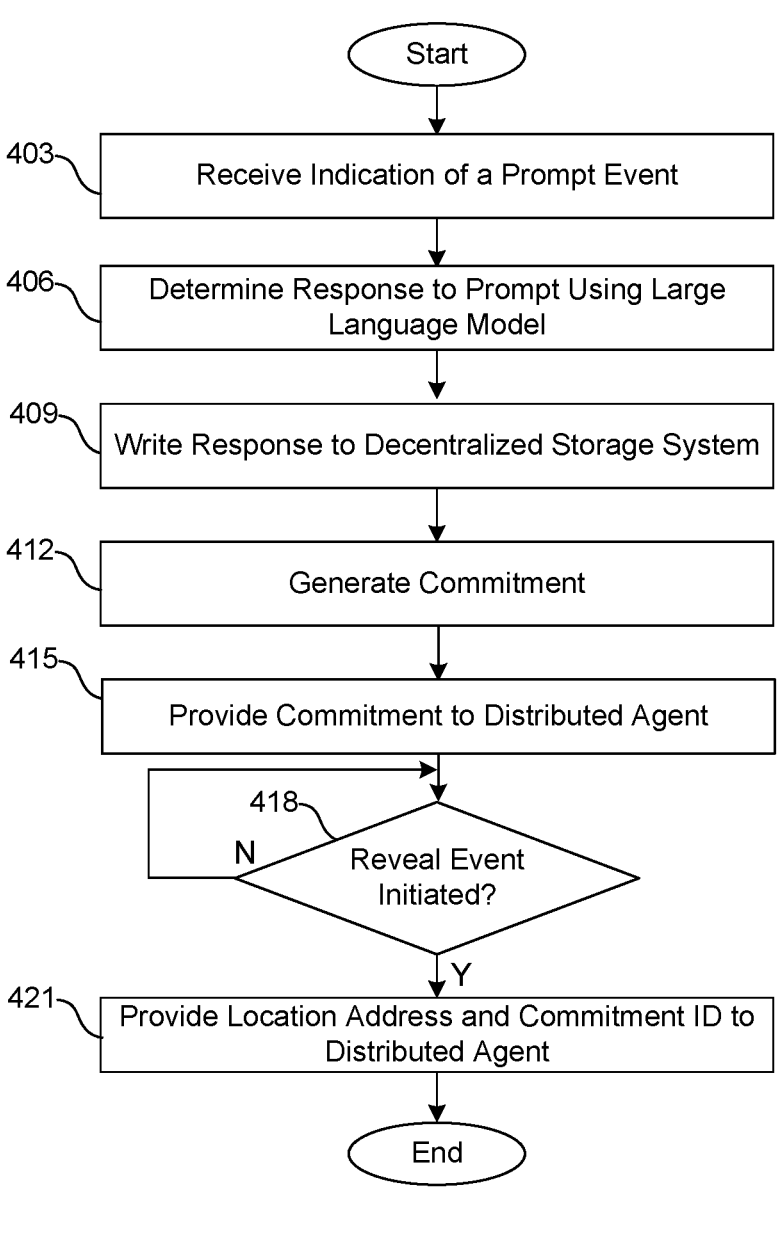
403— Receive Indication of a Prompt Event
406— Determine Response to Prompt Using Large Language Model
409— Write Response to Decentralized Storage System
412— Generate Commitment
415— Provide Commitment to Distributed Agent
418— Reveal Event Initiated? N
Y
421— Provide Location Address and Commitment ID to Distributed Agent
Start
End
FIG. 4
212

118

GENERATIVE LARGE LANGUAGE MODEL (LLM) DECENTRALIZED NETWORK

BACKGROUND

Large language models (LLMs) are expanding the use of artificial intelligence (AI) exponentially. In various examples, users can interact with LLMs to obtain answers to questions. However, one issue with LLMs is hallucinations. Hallucinations can occur when there is inconsistent or bad information included in the training data for an LLM, thereby causing the output of an LLM to be inaccurate or otherwise false. As the use of LLMs proliferates, there is a need to minimize inaccuracies caused by hallucinations so that the inquiring party can trust the responses provided.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4-6 are flowcharts illustrating examples of functionality implemented as portions of applications executed in the network environment of FIG. 2 according to various embodiments of the present disclosure.

DETAILED DESCRIPTION

Disclosed are various approaches for minimizing hallucination-based responses by verifying or otherwise identifying one or more accurate responses generated by multiple large language model (LLM) service providers to a prompt through the use of a decentralized network. In various examples, LLM service providers (e.g., software as a service (SaaS) LLMs, chatbots, etc.) can be part of a decentralized network that allows multiple LLM service providers to receive a prompt originating from a user or computing device. Each LLM service provider in the network can generate a response to the prompt by applying the prompt to one or more LLM models associated with the LLM service. Once a response has been formulated, the LLM service provider can transmit the response to a decentralized data storage, which can receive and store the response in the decentralized data storage. In various examples, a threshold number of stored responses can be compared to one another to determine a level of similarity between responses and to identify any response that may correspond to a hallucination and, therefore, an inaccurate response.

The concepts of the present disclosure can be based at least in part on the assumption that two or more LLMs that are built using different architectures have a near-zero probability of generating the same fake response to when provided with the same prompt. By having one or multiple third parties assess the similarity of the responses provided by a LLM service, a decision can be made on whether the resulting answer is or is not a hallucination. In various examples, the participating LLM service providers can be competitors, and the decentralized solution can provide a mutually beneficial cooperation system that increases the competition among the LLM service providers while providing better services to users by ensuring accurate responses to queries. According to various examples, a distributed agent (e.g., a smart contract) on a distributed ledger (e.g. blockchain) can coordinate the responses provided by the LLM service providers and with the use of similarity detection services (e.g., oracles) exclude any hallucination outputs. In some examples, LLM services providers who provide hallucination outputs can be penalized for providing inaccurate responses to the queries. As such, the competitive nature of the LLM service providers can further increase the reliability of the associated LLMs and the LLM services.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
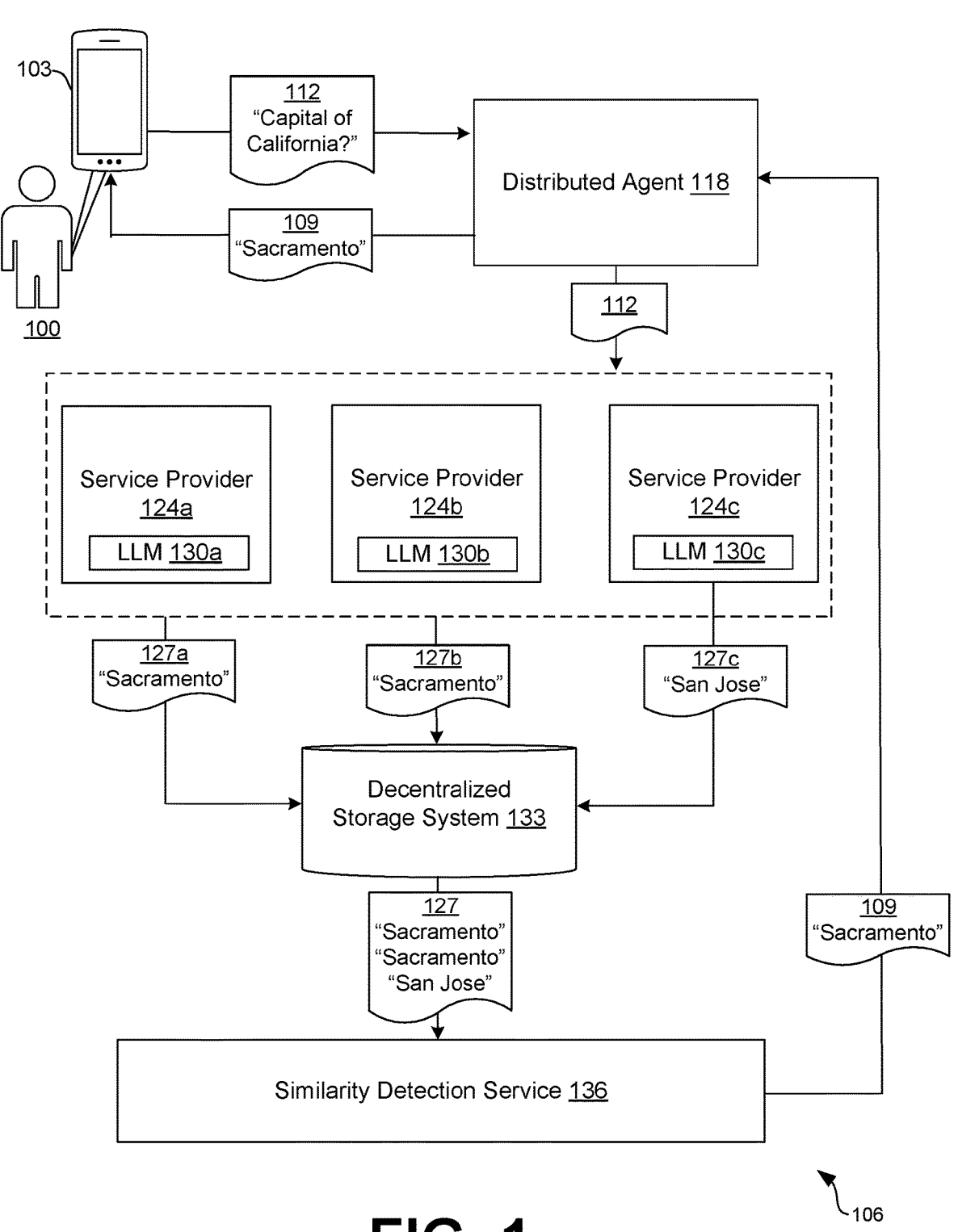
FIG. 1 is a drawing depicting one of several embodiments of the present disclosure.
Figure 2:
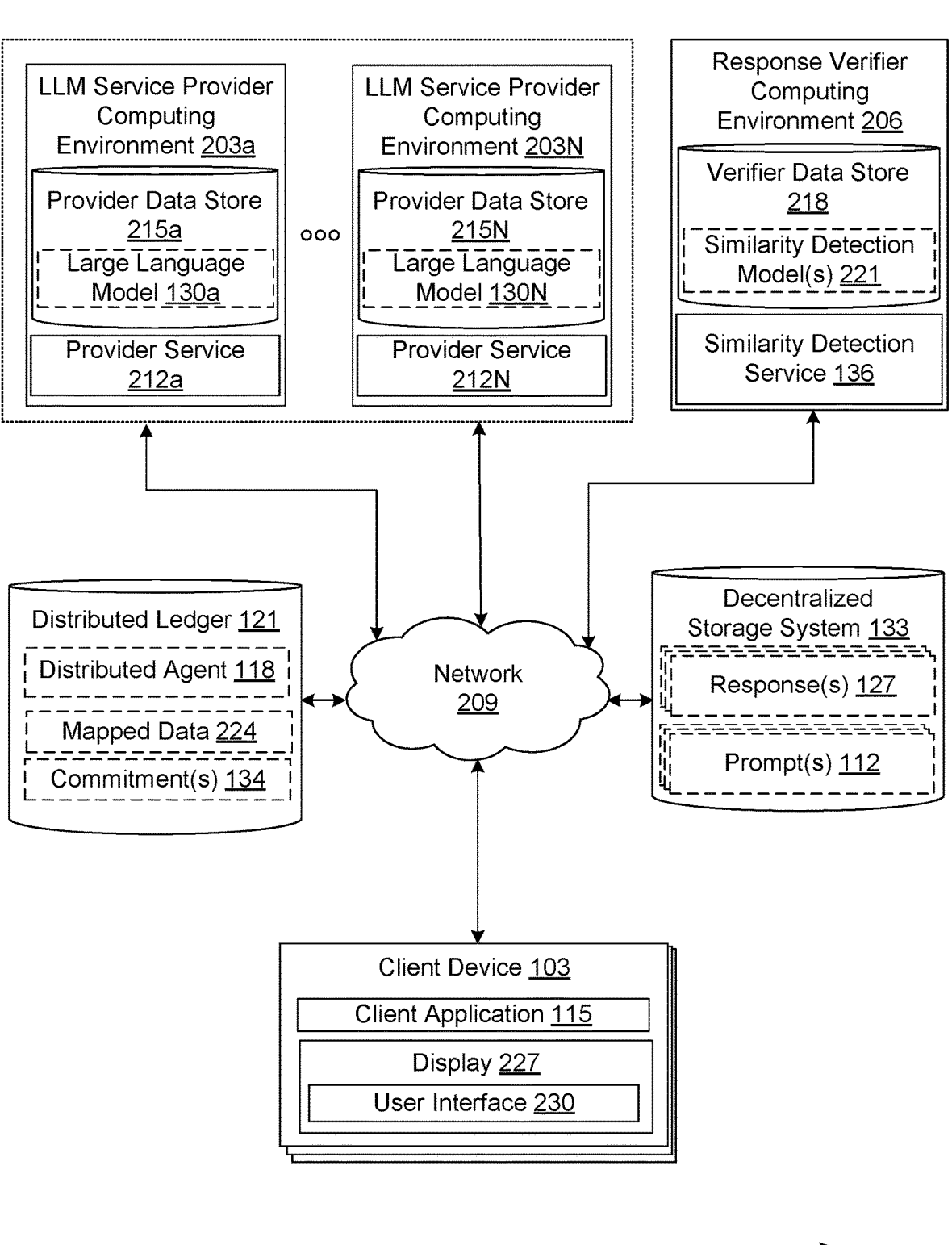
FIG. 2 is a drawing of a network environment according to various embodiments of the present disclosure.

Turning now to FIG. 1, shown is an example of a schematic illustrating a user 100 of a client device 103 interacting with a decentralized hallucination minimization system 106 in order to determine an accurate response 109 to a given prompt 112. In this example, the prompt 112 is "What is the capital of California?" For example, the user 100 can interact with a client application 115 (FIG. 2) executing on the client device 103 to request a response 109 to the prompt 112. The client application 115 can invoke a distributed agent 118 executing on one or more computing devices of a distributed ledger 121 (FIG. 2). In various examples, the client application 115 can invoke the distributed agent 118 via an application programming interface (API) call that includes the prompt 112.

In various examples, the distributed agent 118 can initiate a prompt event with participating LLM service providers 124 (e.g., 124a, 124b, 124c) that requests the participating LLM service providers 124 to generate a provider response 127 (e.g., 127a, 127b, 127c) to the prompt 112. An LLM service provider can comprise a service provider that uses LLMs 130 (e.g., 130a, 130b, 130c) to provide a given service (e.g., answer a question). Examples of LLMs 130 include various versions of OPENAI's Generative Pretrained Transformer (GPT) model (e.g., GPT-1, GPT-2, GPT-3, GPT-4, etc.), META's Large Language Model Meta AI (LLAMA), and GOOGLE's Pathways Language Model 2 (PaLM 2), among others. An LLM service provider 124 can be associated with a provider service 212 (FIG. 2) that can include, for example, CHATGPT, MICROSOFT BING, GOOGLE BARD AI, OPEN AI, among others. An LLM servicer provider 124 can be a registered participant in a decentralized hallucination minimization system 106.

In various examples, an LLM service provider 124 via the provider service 212 can execute an LLM 130 to determine a provider response 127 to the prompt 112. In the example of FIG. 1, the provider response 127a generated by LLM service provider 124a is "Sacramento," the provider response 127b generated by LLM service provider 124b is "Sacramento," and the provider response 127c generated by LLM service provider 124c is "San Jose." Each LLM service provider 124 can transmit the corresponding provider response 127 to a decentralized storage system 133 which can receive and write or otherwise store the corresponding provider response 127 in the decentralized storage system 133.

In some examples, the LLM service provider 124 via the provider service 212 can notify the distributed agent 118 of the location address of the provider response 127. In other examples, upon writing the provider response 127 to the decentralized storage system 133, each LLM service provider 124 via the provider service 212 can generate a commitment 134 (FIG. 2) using a commitment scheme (e.g., Pedersen commitment) that is based at least in part on a location address of the provider response 127 in the decentralized storage system 133 and a randomly generated commitment identifier. The LLM service provider 124, via the provider service 212, can transmit the generated commitment 134 to the distributed agent 118 to indicate that a provider response 127 has been generated and transmitted to the decentralized storage system 133. A commitment 134 is a cryptographic indication that the commitment generator (e.g., service provider 124) has a chosen value (e.g., the provider response 127) while keeping the value hidden or secret from others. Generating a commitment 134 associated with a provider response 127 can prevent byzantine players (e.g., other service providers 124) from plagiarizing the responses of others.

Upon determining that a threshold number of commitments 134 are received by the distributed agent 118, the distributed agent 118 can initiate a response reveal event which causes each of the LLM service providers 124 to provide via the provider service 212 the location address of the provider response 127 and the commitment identifier to the distributed agent 118. The distributed agent 118 can then verify the location address associated with the stored provider response 127 using the previously received commitment 134 and a commitment scheme.

Once the location addresses are received and, when applicable, verified, the distributed agent 118 can initiate a response verification event. The response verification event can be initiated by sending a request or executing a function to send the request to one or more similarity detection services 136. In various examples, the request to initiate the response verification event can include the location addresses to each of the stored provider responses 127 in the decentralized storage system 133. As such, the similarity detection service 136 can obtain each of the provider responses 127 from the decentralized storage system 133 using the provider location addresses.

In various examples, the similarity detection service 136 can compare the provider responses 127 to determine a similarity between one or more responses and exclude any provider responses that are potential hallucinations based at least in part on the similarity. For example, the provider responses 127 can be compared to one another to determine a level of similarity between the different provider responses 127. For example, in FIG. 1, provider responses 127a and 127b (e.g., "Sacramento") will be considered similar while provider response 127c (e.g., "San Jose") is not similar to provider responses 127a and 127b. As such, provider responses 127a and/or 127b will be provided to the distributed agent 118 as the accurate response(s) 109.

In one example, the similarity detection service 136 can execute a trained large language model 130 and provide the provider responses 127 as inputs with a question of which of the provider responses 127 are similar enough to be considered an accurate response 109. The output of the large language model 130 can include one or more of the provider responses 127 that can be considered an accurate response 109 to return to the distributed agent 118.

In another example, the similarity detection service 136 can convert each of the provider responses 127 to vector embeddings and apply the vector embeddings as inputs to a trained similarity model. In various examples, the similarity model can be trained to calculate the Euclidean distance between the response and reject any of the provider responses 127 where the Euclidean distance meets or exceeds a given threshold. One or more of the remaining responses 127 can be transmitted back to the distributed agent 118 as the accurate responses 109.

In another example, the similarity detection service 136 can execute a model that is configured to accept the provider response 127 as inputs and capture the hidden state of each of the responses. The provider responses 127 of any hidden states that are different (e.g., outside a cluster) can be discarded as being potential hallucinations and one or more of the remaining provider responses 127 can be transmitted back to the distributed agent 118 as the accurate responses 109.

In various examples, the distributed agent 118 can initiate the response verification event with multiple similarity detection services 136. In this example, the distributed agent 118 may receive multiple accurate responses 109 from the multiple similarity detection services 136 and the distributed agent 118 can select the accurate response 109 provided from the majority of the similarity detection services 136.

Once the distributed agent 118 receives the accurate response 109 from the one or more similarity detection services, the distributed agent 118 can provide the accurate response 109 to the client device 103 for rendering or otherwise displaying. In some examples, if there are multiple similar but not identical accurate responses 109 provided to the distributed agent 118, the received responses can be aggregated to provide a more comprehensive response to the prompt 112.

With reference to FIG. 2, shown is a network environment 200 according to various embodiments. The network environment 200 can include a plurality of LLM service provider computing environments 203 (e.g., 203a . . . 203N), a response verifier computing environment 206, a distributed ledger 121, a decentralized storage system 133, and a client device 103, which can be in data communication with each other via a network 209.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The LLM service provider computing environment(s) 203 and the response verifier computing environment 206 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the LLM service provider computing environment(s) 203 and the response verifier computing environment 206 can each employ a plurality of computing devices that can be arranged in one or more server banks or computer banks or other arrangements. Such computing devices can be located in a single installation or can be distributed among many different geographical locations. For example, LLM service provider computing environment(s) 203 and the response verifier computing environment 206 can each include a plurality of computing devices that together can include a hosted computing resource, a grid computing resource or any other distributed computing arrangement. In some cases, the LLM service provider computing environment(s) 203 and the response verifier computing environment 206 can each correspond to an elastic computing resource where the allotted capacity of processing, network, storage, or other computing-related resources can vary over time.

Various applications or other functionality can be executed in the LLM service provider computing environment 203. The components executed on the LLM service provider computing environment 203 include a provider service 212 (e.g., 212a, 212N), and other applications, services, processes, systems, engines, or functionality not discussed in detail herein.

The provider service 212 can be executed to interact with a distributed agent 118 stored in a distributed ledger 121 and executed by one or more computing nodes of the distributed ledger 121. In various examples, the provider service 212 can determine that a prompt event has been initiated by the distributed agent 118. In some examples, the provider service 212 receives a notification from the distributed agent 118 indicating the start of the prompt event. The notification can include a prompt 112 that is generated by a client device 103, a prompt identifier, and/or other data.

In response to the prompt event, the provider service 212 can execute one or more large language models 130 to generate a provider response 127 to a given prompt (e.g. prompt 112). A large language model 130 can represent any language model that includes a neural network with many parameters (tens of thousands, millions, or sometimes even billions or more) that is trained on large quantities of unlabeled text using self-supervised learning or semi-supervised learning techniques. Some large language models 130 may be generative-that is they can generate new data based at least in part on patterns and structure learned from their input training data. Examples of large language models 130 include various versions of OPENAI's Generative Pre-trained Transformer (GPT) model (e.g., GPT-1, GPT-2, GPT-3, GPT-4, etc.), META's Large Language Model Meta AI (LLAMA), and GOOGLE's Pathways Language Model 2 (PaLM 2), among others. A large language model 130 can be configured to return a response to a prompt, which can be in a structured form (e.g., a request or prompt with a predefined schema and/or parameters) or in an unstructured form (e.g., free form or unstructured text). Using the example of FIG. 1, a prompt 112 could be "What is the capital of California?".

In response to determining the provider response 127 based at least in part on the output of the LLM 130, the provider service 212 can write or otherwise store the corresponding provider response 127 to a decentralized storage system 133. For example, the provider response 127 can invoke a write function associated with the decentralized storage system 133 to write the provider response 127 to the decentralized storage system 133. In various examples, the provider response can notify the distributed agent 118 of the location address of the provider response 127 within the decentralized storage system 133.

In other examples, upon writing the provider response 127 to the decentralized storage system 133, the provider service 212 can generate a commitment 134 using a commitment scheme (e.g., Pedersen commitment) that is based at least in part on a location address of the provider response 127 in the decentralized storage system 133 and a randomly generated commitment identifier. The provider service 212 can transmit the generated commitment 134 to the distributed agent 118 to indicate that a provider response 127 has been generated and transmitted to the decentralized storage system 133. Upon determining that a threshold number of commitments 134 are received by the distributed agent 118, the distributed agent 118 can initiate a response reveal event which causes each of the LLM service providers 124 to provide via the provider service 212 the location address of the provider response 127 and the commitment identifier to the distributed agent 118.

Also, various data is stored in a provider data store 215 (e.g., 215a . . . 215N) that is accessible to the LLM service provider computing environment 203. The data store 215 can be representative of a plurality of data stores 215, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in a provider data store 215 is associated with the operation of the various applications or functional entities described below. This data can include large language models 130, and potentially other data.

A large language model 130 can represent any language model that includes a neural network with many parameters (tens of thousands, millions, or sometimes even billions or more) that is trained on large quantities of unlabeled text using self-supervised learning or semi-supervised learning techniques. Some large language models 130 may be generative-that is they can generate new data based at least in part on patterns and structure learned from their input training data. A large language model 130 can be configured to return a response to a prompt, which can be in a structured form (e.g., a request or prompt with a predefined schema and/or parameters) or in an unstructured form (e.g., free form or unstructured text).

Various applications or other functionality can be executed in the response verifier computing environment 206. The components executed on the response verifier computing environment 206 include a similarity detection service 136, and other applications, services, processes, systems, engines, or functionality not discussed in detail herein.

The similarity detection service 136 can be executed to receive a request to initiate the response verification event from the distributed agent 118. The request can include the location addresses to each of the stored provider responses 127 in the decentralized storage system 133. As such, the similarity detection service 136 can obtain each of the provider responses 127 from the decentralized storage system 133 using the provider location addresses.

In various examples, the similarity detection service 136 can compare the provider responses 127 to determine a similarity between one or more responses and exclude any provider responses that are potential hallucinations based at least in part on the similarity. For example, the provider responses 127 can be compared to one another to determine a level of similarity between the different provider responses 127. Using the example of FIG. 1, provider responses 127a and 127b (e.g., "Sacramento") will be considered similar while provider response 127c (e.g., "San Jose") will not be considered similar to provider responses 127a and 127b. As such, provider responses 127a and/or 127b will be provided to the distributed agent 118 as the accurate response(s) 109.

In one example, the similarity detection service 136 can execute a trained large language model 130 and provide the provider responses 127 as inputs with a question of which of the provider responses 127 are similar enough to be considered an accurate response 109. The output of the large language model 130 can include one or more of the provider responses 127 that can be considered an accurate response 109 to return to the distributed agent 118.

In another example, the similarity detection service 136 can convert each of the provider responses 127 to vector embeddings and apply the vector embeddings as inputs to a trained similarity model. In various examples, the similarity model can be trained to calculate the Euclidean distance between the response and reject any of the provider responses 127 where the Euclidean distance meets or exceeds a given threshold. One or more of the remaining provider responses 127 can be transmitted back to the distributed agent 118 as the accurate responses 109.

In another example, the similarity detection service 136 can execute a model that is configured to accept the provider response 127 as inputs and capture the hidden state of each of the responses. The provider responses 127 of any hidden states that are different (e.g., outside a cluster) can be discarded as being potential hallucinations and one or more of the remaining responses 127 can be transmitted back to the distributed agent 118 as the accurate responses 109.

Also, various data is stored in a verifier data store 218 that is accessible to the response verifier computing environment 206. The verifier data store 218 can be representative of a plurality of data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the verifier data store 218 is associated with the operation of the various applications or functional entities described below. This data can include one or more similarity detection model(s) 221, and potentially other data.

A similarity detection model 221 can include a decision tree classifier, a gradient boost classifier, a Gaussian naïve Bayes classifier, a reinforcement learning algorithm, a logistic regression classifier, a random forest classifier, a decision tree classifier, a multi-layer perceptron classifier, a recurrent neural network, a neural network, a label-specific attention network, an ensemble model, and/or any other type of trained model as can be appreciated. It should be noted that although the similarity detection model 221 is illustrated in FIG. 2 as being stored and executed within the response verifier computing environment 206, in some examples, the similarity detection model 221 can be stored and/or executed in another computing environment that is separate and independent from the response verifier computing environment 206.

In various examples, the similarity detection model 221 can comprise a language model that includes a neural network with many parameters (tens of thousands, millions, or sometimes even billions or more) that is trained on large quantities of unlabeled text using self-supervised learning or semi-supervised learning techniques. Some large language models may be generative-that is they can generate new data based at least in part on patterns and structure learned from their input training data. A large language model can be configured to return a response to a prompt, which can be in a structured form (e.g., a request or prompt with a predefined schema and/or parameters) or in an unstructured form (e.g., free form or unstructured text). In this example, the prompt for the similarity detection model 221 can include the provider responses 127 and a prompt 112 asking which provider responses 127 are similar.

In other examples, the similarly detection model 221 can comprise Semantic Text Similarity (STS) AI model that is trained to evaluate how similar tow texts (e.g., provider responses 127) are in meaning. In this example, the output of the similarity detection model 221 can comprise one or more similarity scores and the provider service 212 can determine the accurate response 109 based at least in part on the similarity scores and a given threshold value.

In other examples, the similarity detection model 221 can comprise a model that is configured to accept the provider response 127 as inputs and capture the hidden state of each of the provider responses 127. The provider responses 127 of any hidden states that are different (e.g., outside a cluster) can be discarded as being potential hallucinations and one or more of the remaining provider responses 127 can be transmitted back to the distributed agent 118 as the accurate responses 109.

The distributed ledger 121 represents a synchronized, eventually consistent, data store spread across multiple nodes in different geographic or network locations. Each member of the distributed ledger 121 can contain a replicated copy of the distributed ledger 121, including all data stored in the distributed ledger 121. Records of transactions involving the distributed ledger 121 can be shared or replicated using a peer-to-peer network connecting the individual members that form the distributed ledger 121. Once a transaction or record is recorded in the distributed ledger 121, it can be replicated across the peer-to-peer network until the record is eventually recorded with all members. Various consensus methods can be used to ensure that data is written reliably to the distributed ledger 121. Examples of a distributed ledger can include blockchains, distributed hash tables (DHTs), and similar data structures.

Various data can also be stored in a distributed ledger 121. This can include a distributed agent 118, mapped data 224 and/or other information. However, any other data discussed in the present disclosure could also be stored in the distributed ledger 121 if the public availability of the data were acceptable in that particular implementation.

The distributed agent 118 can represent a script or other executable which can be stored in the distributed ledger 121 and executed by individual hosts or peers of the distributed ledger 121. When a computation is performed by the distributed agent 118, each host or peer that forms the distributed ledger 121 can perform the computation and compare its result with the results computed by other hosts or peers. When a sufficient number of hosts or peers forming the distributed ledger 121 agree on the result of the computation, the result can be stored in the distributed ledger 121 or provided to the computing device that invoked the distributed agent 118. An example of a distributed agent 118 is a "smart contract" used in the ETHEREUM platform, although other distributed ledger or blockchain-based technologies provide the same or similar functionality which may also be referred to as a "smart contract." In various examples, the distributed agent 118 can be private, public, or a hybrid. For example, the distributed agent 118 can have private functions and/or public functions for performing one or more tasks.

In various examples, the distributed agent 118 of the present disclosure can be invoked by a client application 115 of a client device 103 to request a response to a prompt 112. In various examples, upon being invoked, the distributed agent 118 can generate a prompt identifier to identify the given prompt 112 and update the mapped data 224 to include a private or public mapping of the prompt identifier and given prompt 112.

The distributed agent 118 can also generate and initiate a prompt event which can notify a plurality of provider services 212 of a received prompt 112 and request that the provider services 212 generate provider responses in response to the received prompt 112. The distributed agent 118 can receive indications from the provider services 212 that the provider responses 127 have been transmitted to and stored by to the decentralized storage system 133 and can determine whether a threshold number of provider responses 127 have been stored in the decentralized storage system 133. For example, the distributed agent 118 can receive commitments 134 and/or location addresses from each of the provider services 127 indicating that they have transmitted and stored provider responses 127 in the decentralized storage system 133.

In various examples, the distributed agent 118 can verify the commitments 134 in response to determining a threshold number of commitments 134 have been received. In this example, the distributed agent 118 can receive the location address and a commitment identifier associated with a given provider response 127. The distributed agent 118 can verify the commitments 134 using a commitment scheme (e.g., Pedersen commitment scheme).

Once the location addresses are received and verified, when applicable, the distributed agent 118 can initiate a response verification event. The response verification event can be initiated by sending a request or executing a function to send the request to one or more similarity detection services 136. In various examples, the request to initiate the response verification event can include the location addresses to each of the stored provider responses 127 in the decentralized storage system 133. The distributed agent 118 can obtain the accurate response(s) 109 from the similarity detection service(s) 136 and can transmit one or more of the accurate responses 109 received to the client device 103 in response to the prompt 112.

The decentralized storage system 133 can comprise any suitable decentralized storage medium capable of securely storing data. For example, and in accordance with various embodiments, the decentralized storage system 133 be an InterPlanetary File System (IPFS) comprising a file system capable of receiving, storing, and sharing data across a distributed, peer-to-peer network. The IPFS implementation may comprise a distributed hash table (DHT) that stores data as key (document locator)/value pairs across the peer-to-peer file system.

In various embodiments, the decentralized storage system 133 may use features and functionality of blockchain technology, including, for example, consensus based validation, immutability, and cryptographically chained blocks of data. For example, the decentralized storage system 133 can represent synchronized, eventually consistent, data store spread across multiple nodes in different geographic or network locations. Each member of the decentralized storage system 133 can contain a replicated copy of the decentralized storage system 133, including all data stored in the decentralized storage system 133. Records of transactions involving the decentralized storage system 133 can be shared or replicated using a peer-to-peer network connecting the individual members that form the decentralized storage system 133. Once a transaction or record is recorded in the decentralized storage system 133, it can be replicated across the peer-to-peer network until the record is eventually recorded with all members. Various consensus methods can be used to ensure that data is written reliably to the decentralized storage system 133. Examples of the decentralized storage system 133 can include blockchains, distributed hash tables (DHTs), and similar data structures. Various data can also be stored in the decentralized storage system 133. This can include a provider responses 127, queries 112 and/or other information.

The client device 103 is representative of a plurality of client devices that can be coupled to the network 209. The client device 103 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays 227, such as liquid crystal displays (LCDs), gas plasma-based flat panel displays, organic light emitting diode (OLED) displays, electrophoretic ink ("E-ink") displays, projectors, or other types of display devices. In some instances, the display 227 can be a component of the client device 103 or can be connected to the client device 103 through a wired or wireless connection.

The client device 103 can be configured to execute various applications such as a client application 115 or other applications. The client application 115 can be executed in a client device 103 to access network content served up by servers, thereby rendering or otherwise displaying a user interface 230 on the display 227. To this end, the client application 115 can include a browser, a dedicated application, or other executable, and the user interface 230 can include a network page, an application screen, or other user mechanism for obtaining user input. The client device 103 can be configured to execute applications beyond the client application 115 such as email applications, social networking applications, word processors, spreadsheets, or other applications.

Figure 3A:
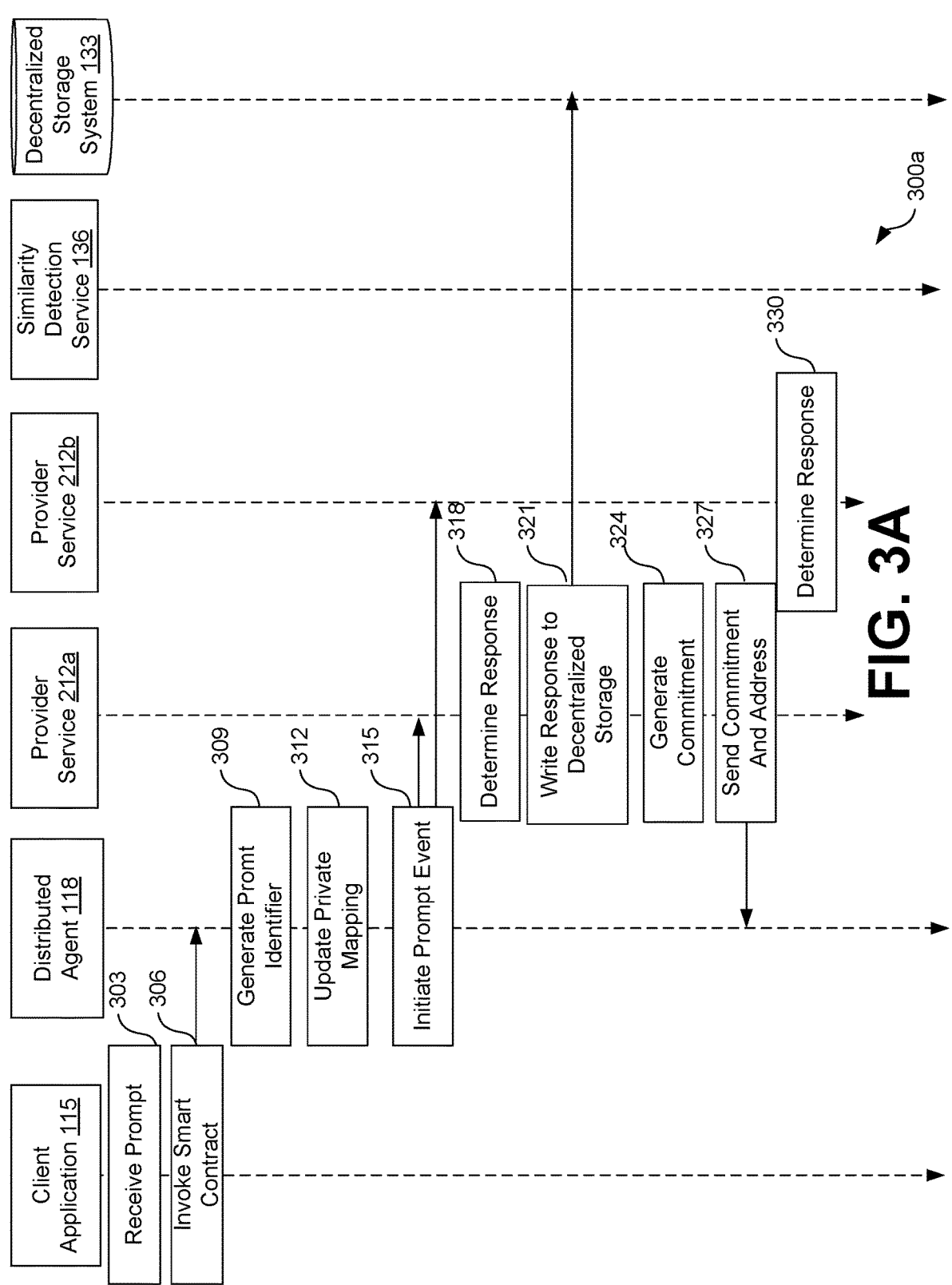
FIGS. 3A and 3B are sequence diagrams illustrating examples of functionality in the network environment of FIG. 2 according to various embodiments of the present disclosure.
Figure 3B:
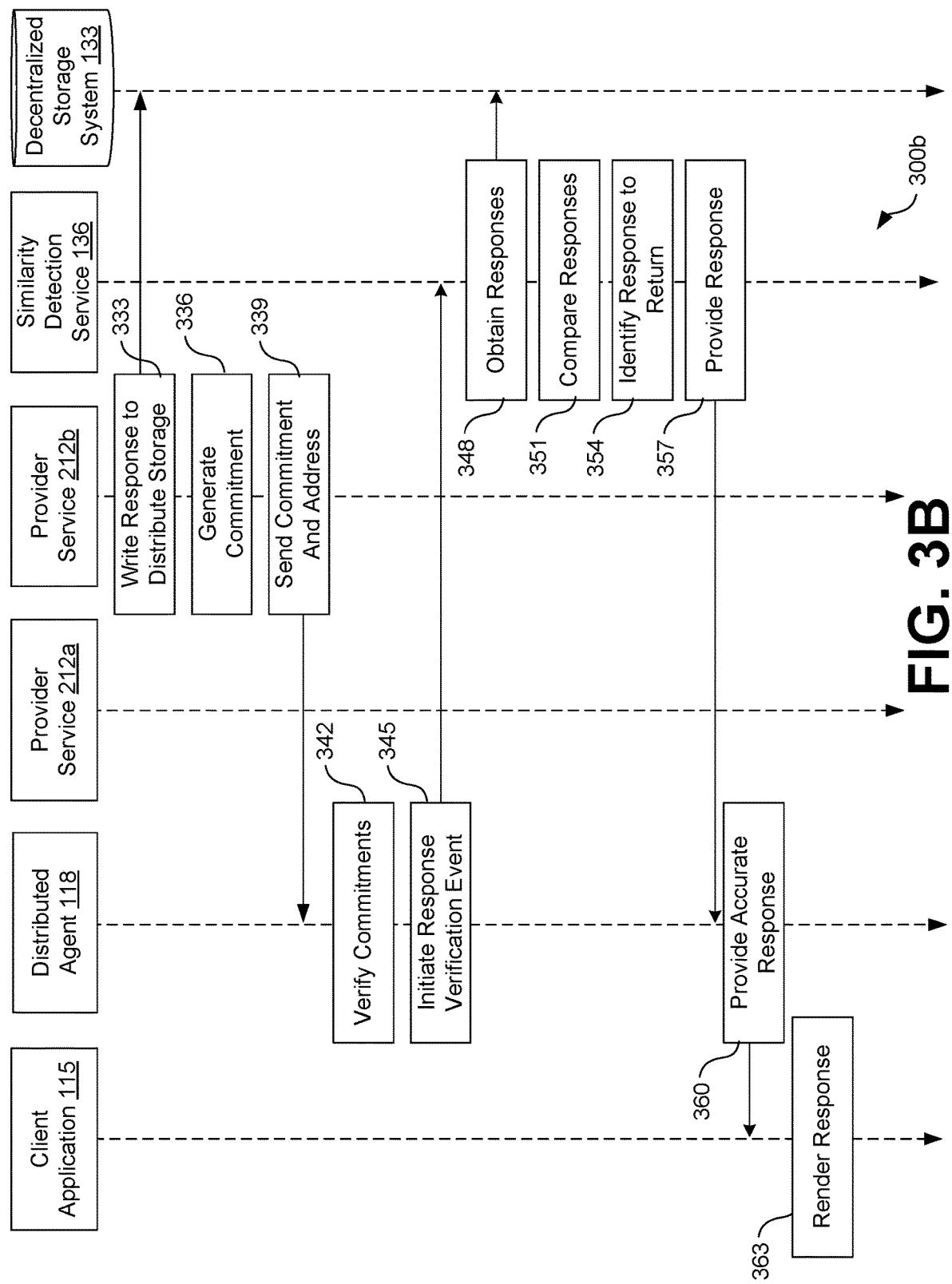

Next, a general description of the operation of the various components of the network environment 200 is provided with reference to FIGS. 3A, 3B and 4-6. To begin, FIGS. 3A and 3B illustrate a sequence diagram 300 (e.g., 300*a*, 300*b*) that provides an example of the operation of the components of the network environment 200. It is understood that the sequence diagram 300 of FIGS. 3A and 3B provides merely an example of the many different types of functional arrangements that can be employed to implement the operation of the depicted portion of the network environment 200. As an alternative, the sequence diagram 300 of FIGS. 3A and 3B can be viewed as depicting an example of elements of a method implemented within the network environment 200. In particular, the sequence diagram 300 of FIGS. 3A and 3B depicts the functionality associated with providing a response 109 to a prompt 112 using LLM service providers 124 (FIG. 1) and a decentralized network.

Beginning with block 303, a client application 115 can receive a prompt 112 via an interaction with the client application 115. In some examples, a user can enter a prompt 112 in text form in a user interface 230 rendered or otherwise displayed on the client device. In other examples, the user can provide a prompt 112 through interactions with a voice user interface or an interactive vertical assistant. In some examples, the prompt 112 is generated by an application or service executing on the client device 103. For example, the prompt 112 can by digitally generated by another application and/or the client application 115 to obtain information or data required to perform some sort of function. The prompt 112 can correspond to a prompt or question that requires an answer or response.

At block 306, the client application 115 can invoke a distributed agent 118 that is executable on a distributed ledger 121. The distributed agent 118 can represent a script or other executable which can be stored in the distributed ledger 121 and executed by individual hosts or peers of the distributed ledger 121. In some examples, the client application 115 can invoke the distributed agent 118 via an application programming interface (API) call and include the prompt 112 in the API call with the invocation request.

At block 309, the distributed agent 118 generates a prompt identifier. The prompt identifier comprises an identifier that uniquely identifies the prompt 112. In various examples, prompt identifier can comprise randomly generated numeric or alphanumeric characters.

At block 312, the distributed agent 118 updates the mapped data 224 to include a mapping of the prompt identifier and the prompt 112. In various examples, the mapping is a private mapping. The mapped data 224 can be used to track the prompt and the status of the prompt 112 prior to returning an accurate response 109 to the client application 115.

At block 315, the distributed agent 118 initiates a prompt event. A prompt event can be initiated with participating LLM service providers 124 by sending the corresponding provider services 212 a request to generate a provider response 127 to the prompt 112. The prompt event request can be transmitted or otherwise broadcasted to any registered LLM service providers 124 and can include the prompt 112 and prompt identifier associated with the prompt event.

At block 318, the provider service 212a determines a provider response 127 to the prompt 112. For example, the provider service 212a can execute one or more large language models 130 to generate a provider response 127 to a given prompt (e.g. prompt 112). A large language model 130 can represent any language model that includes a neural network with many parameters (tens of thousands, millions, or sometimes even billions or more) that is trained on large quantities of unlabeled text using self-supervised learning or semi-supervised learning techniques. Some large language models 130 may be generative-that is they can generate new data based at least in part on patterns and structure learned from their input training data. The provider service 212a can execute an LLM 130 and apply the prompt 112 as a prompt to the LLM 130. The output of the LLM 130 can comprise a provider response 127 to the prompt 112.

At block 321, the provider service 212a writes or otherwise stores the provider response 127 to the decentralized storage system 133. For example, the provider response 127 can invoke a write function associated with the decentralized storage system 133 to write the provider response 127 to the decentralized storage system 133. In some examples, the provider service 212a can obtain the location address associated with the provider response 127 that is stored in the decentralized storage system 133 from the decentralized storage system 133. In other examples, the provider service 212a defines the location address associated with the provider response 127.

At block 324, the provider service 212a can generate a commitment 134. A commitment 134 is a cryptographic indication that that commitment generator (e.g., LLM service provider 124) has a chosen value (e.g., the provider response 127) while keeping the value hidden or secret from others. Generating a commitment 134 associated with a provider response 127 can prevent byzantine players (e.g., other LLM service providers 124) from plagiarizing the responses of others. In various examples, the commitment 134 is generated using a commitment scheme (e.g., Pedersen commitment) that is based at least in part on a location address of the provider response 127 in the decentralized storage system 133 and a randomly generated commitment identifier. The commitment identifier can be generated by the provider service 212a prior to generating the commitment 134.

At block 327, the provider service 212a can transmit the commitment 134, the location address, and the commitment identifier to the distributed agent 118. In some examples, the commitment 134 is transmitted to the distributed agent 118 prior to the location address and the commitment identifier. In this example, the location address and the commitment identifier are transmitted in response to a response reveal event initiated by the distributed agent 118. The response reveal event can be initiated when a threshold number of commitments 134 are received by the distributed agent.

At block 330, the provider service 212b determines a provider response 127 to the prompt 112. For example, the provider service 212b can execute one or more large language models 130 to generate a provider response 127 to a given prompt (e.g. prompt 112). A large language model 130 can represent any language model that includes a neural network with many parameters (tens of thousands, millions, or sometimes even billions or more) that is trained on large quantities of unlabeled text using self-supervised learning or semi-supervised learning techniques. Some large language models 130 may be generative—that is they can generate new data based at least in part on patterns and structure learned from their input training data. The provider service 212b can execute an LLM 130 and apply the prompt 112 as a prompt to the LLM 130. The output of the LLM 130 can comprise a provider response 127 to the prompt 112.

At block 333, the provider service 212b writes or otherwise stores the provider response 127 to the decentralized storage system 133. For example, the provider response 127 can invoke a write function associated with the decentralized storage system 133 to write the provider response 127 to the decentralized storage system 133. In some examples, the provider service 212b can obtain the location address associated with the provider response 127 that is stored in the decentralized storage system 133 from the decentralized storage system 133. In other examples, the provider service 212b defines the location address associated with the provider response 127.

At block 336, the provider service 212*b* can generate a commitment 134. A commitment 134 is a cryptographic indication that that commitment generator (e.g., LLM service provider 124) has a chosen value (e.g., the provider response 127) while keeping the value hidden or secret from others. Generating a commitment 134 associated with a provider response 127 can prevent byzantine players (e.g., other LLM service providers 124) from plagiarizing the responses of others. In various examples, the commitment 134 is generated using a commitment scheme (e.g., Pedersen commitment) that is based at least in part on a location address of the provider response 127 in the decentralized storage system 133 and a randomly generated commitment identifier. The commitment identifier can be generated by the provider service 212*b* prior to generating the commitment 134.

At block 339, the provider service 212*b* can transmit the commitment 134, the location address, and the commitment identifier to the distributed agent 118. In some examples, the commitment 134 is transmitted to the distributed agent 118 prior to the location address and the commitment identifier. In this example, the location address and the commitment identifier are transmitted in response to a response reveal event initiated by the distributed agent 118. The response reveal event can be initiated when a threshold number of commitments 134 are received by the distributed agent 118.

At block 342, the distributed agent 118 verifies the commitments 134. For example, the distributed agent 118 can verify the commitments 134 based at least in part on can the location address associated with the stored provider response 127 and the commitment identifier provided by each of the provider services 212. The commitments 134 can be verified using a commitment scheme (e.g., Pederson commitment).

At block 345, the distributed agent 118 initiates a response verification event. The response verification event can be initiated by sending a request or executing a function to send the request to one or more similarity detection services 136. In various examples, the request to initiate the response verification event can include the location addresses to each of the stored provider responses 127 in the decentralized storage system 133.

At block 348, the similarity detection service 136, obtains the provider responses 127 associated with the response verification event from the decentralized storage system 133. For example, the similarity detection service 136 can obtain each of the provider responses 127 from the decentralized storage system 133 using the provider location addresses that were included in the response verification event initiation request.

At block 351, the similarity detection service 136 compares the provider responses to determine a similarity between one or more responses and exclude any provider responses that are potential hallucinations based at least in part on the similarity. For example, the provider responses 127 can be compared to one another to determine a level of similarity between the different provider responses 127. In various examples, the similarity detection service 136 can apply the one or more provider responses 127 as inputs to one or more similarity detection model(s) 221. In one example, the similarity detection model 221 can include a trained large language model 130 and the similarity detection service 136 can provide the provider responses 127 as inputs with a question of which of the provider responses 127 are similar enough to be considered an accurate response 109. In another example, the similarity detection model 221 can include a trained similarity model and the similarity detection service 136 can convert each of the provider responses 127 to vector embeddings and apply the vector embeddings as inputs to a trained similarity model. In another example, the similarity detection model 221 can include a model that is configured to accept the provider response 127 as inputs and capture the hidden state of each of the responses.

At block 354, the similarity detection service 136 identifies at least one accurate response 109 from the provider responses 127 to return to the distributed agent 118. In some examples, the output of the similarity detection model(s) 221 can be used to identify the at least one accurate response 109. IN some examples, the output of the similarity detection model 221 can comprise one or more accurate responses 109, similarity scores associated with the input provider responses 127, and/or other metric that can be used to represent a similarity level between the provider responses 127. For example, if the output comprises a similarity score, the similarity score can be compared to a similarity threshold to determine whether a given provider response 127 can be considered an accurate response. In some examples, the accurate responses 109 comprises one or more of the provider responses 127. In other examples, the accurate responses 109 can comprise an aggregate of provider responses that are considered similar.

At block 357, the similarity detection service 136 provides one or more of the accurate responses 109 to the distributed agent 118. For example, the similarity detection service 136 can transmit the accurate response(s) 109 to the distributed agent 118 over the network 209, via an API call, and/or other means of communication.

At block 360, the distributed agent 118 provides the accurate response 109 to the client application 115. For example, the similarity detection service 136 can transmit the accurate response(s) 109 to the distributed agent 118 over the network 209, via an API call, and/or other means of communication. At block 363, the client application 115 can render or otherwise display the response 109 on a user interface 230 to allow the user to review the response 109 to the prompt 112. Thereafter, this portion of the process proceeds to completion.

Referring next to FIG. 4, shown is a flowchart that provides one example of the operation of a portion of the provider service 212. The flowchart of FIG. 4 provides merely an example of the many different types of functional arrangements that can be employed to implement the operation of the depicted portion of the provider service 212. As an alternative, the flowchart of FIG. 4 can be viewed as depicting an example of elements of a method implemented within the network environment 200.

Beginning with block 403, the provider service 212 receives an indication of a prompt event. A prompt event can be initiated by a distributed agent 118 with participating LLM service providers 124 by sending the corresponding provider services 212 a request to generate a provider response 127 to the prompt 112. The prompt event request can include the prompt 112 and prompt identifier associated with the prompt event.

At block 406, the provider service 212 determines a provider response 127 to the prompt 112. For example, the provider service 212 can execute one or more large language models 130 to generate a provider response 127 to a given prompt (e.g. prompt 112). A large language model 130 can represent any language model that includes a neural network with many parameters (tens of thousands, millions, or sometimes even billions or more) that is trained on large quantities of unlabeled text using self-supervised learning or semi-supervised learning techniques. Some large language models 130 may be generative-that is they can generate new data based at least in part on patterns and structure learned from their input training data. The provider service 212 can execute an LLM 130 and apply the prompt 112 as a prompt to the LLM 130. The output of the LLM 130 can comprise a provider response 127 to the prompt 112.

At block 409, the provider service 212 the provider service 212 writes or otherwise stores the provider response 127 to the decentralized storage system 133. For example, the provider response 127 can invoke a write function associated with the decentralized storage system 133 to write the provider response 127 to the decentralized storage system 133. In some examples, the provider service 212 can obtain the location address associated with the provider response 127 that is stored in the decentralized storage system 133 from the decentralized storage system 133. In other examples, the provider service 212 defines the location address associated with the provider response 127.

At block 412, the provider service 212 can generate a commitment 134 comprising a cryptographic indication that that the LLM service provider 124 has a chosen value (e.g., the provider response 127) while keeping the value hidden or secret from others. In various examples, the commitment 134 is generated using a commitment scheme (e.g., Pedersen commitment) that is based at least in part on a location address of the provider response 127 in the decentralized storage system 133 and a randomly generated commitment identifier. The commitment identifier can be generated by the provider service 212 prior to generating the commitment 134. At block 415, the provider service 212 can transmit the commitment 134 to the distributed agent 118. In various examples, the provider service 212 can transmit the commitment 134 to the distributed agent 118 over the network 209, via an API call, and/or other means of communication.

At block 418, the provider service 212 can determine whether a response reveal event has been initiated. The response reveal event can be initiated when a threshold number of commitments 134 are received by the distributed agent 118. The response reveal event can be initiated with participating LLM service providers 124 by sending the corresponding provider services 212 a request to provide the location addresses of the stored provider responses 127. If the provider service 212 has not received an indication of the response reveal event, the provider service 212 can wait until a response reveal event has been detected. Otherwise, the provider service 212 can proceed to block 421 where the provider service 212 can transmit the location address and the commitment identifier to the distributed agent 118. Thereafter, this portion of the process proceeds to completion.

Figure 5:
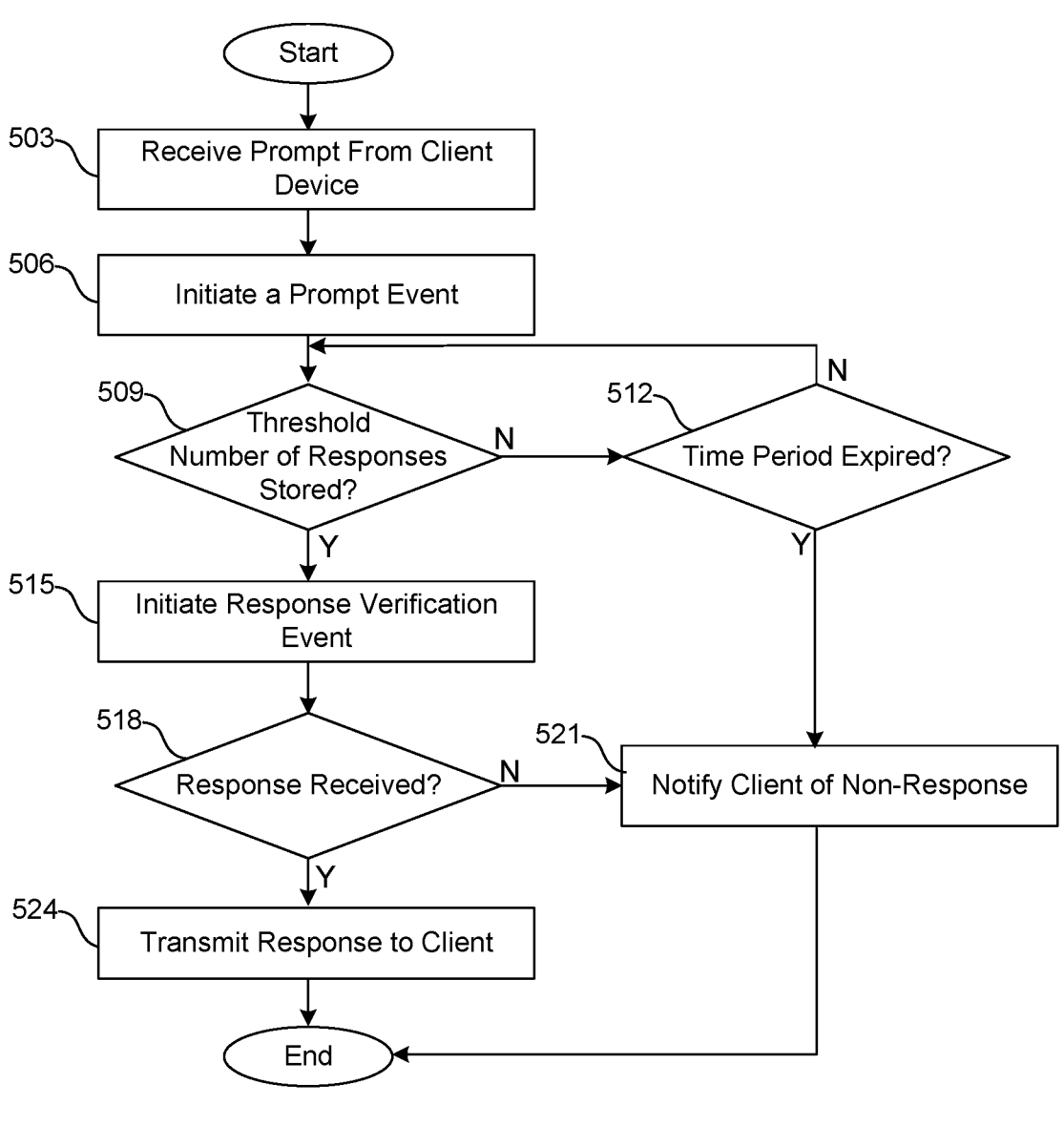

Turning now to FIG. 5, shown is a flowchart that provides one example of the operation of a portion of the distributed agent 118. The flowchart of FIG. 5 provides merely an example of the many different types of functional arrangements that can be employed to implement the operation of the depicted portion of the distributed agent 118. As an alternative, the flowchart of FIG. 5 can be viewed as depicting an example of elements of a method implemented within the network environment 200.

Beginning with block 503, the distributed agent 118 receives a prompt 112 from a client application 115. In various examples, the distributed agent 118 receives the prompt 112 via an application programming interface (API) call initiated from the client application 115. For example, the client application 115 can invoke a distributed agent 118 that is executable on a distributed ledger 121. The prompt 112 can be included in the API call.

At block 506, the distributed agent 118 initiates a prompt event. A prompt event can be initiated with participating LLM service providers 124 by sending the corresponding provider services 212 a request to generate a provider response 127 to the prompt 112. The prompt event request can be transmitted or otherwise broadcasted to any registered LLM service providers 124 and can include the prompt 112 and prompt identifier associated with the prompt event.

At 509, the distributed agent 118 determines if a threshold number of responses have been stored in the decentralized storage system 133. For example, when a LLM service provider 124 via the provider service 212 determines a provider response 127 via an LLM 130, the provider service 212 can write or otherwise store the provider response 127 in the decentralized storage system 133. Upon writing the provider response 127 in the decentralized storage system 133, the provider service 212 can send, when applicable, a commitment 134 and/or a location address of a stored response to the distributed agent 118. As the distributed agent 118 receives an indication of the stored provider responses 127, the distributed agent 118 can determine whether a threshold number of provider responses have been stored.

If the number of stored responses meets or exceeds the threshold number, the distributed agent 118 proceeds to block 515. Otherwise, the distributed agent 118 proceeds to block 512, where the distributed agent 118 determines if a threshold time period has elapsed to receive provider responses 127. If a threshold time period has not elapsed, the distributed agent 118 returns to block 509. Otherwise, the distributed agent 118 proceeds to block 521.

At block 515, the distributed agent 118 initiates a response verification event. The response verification event can be initiated by sending a request or executing a function to send the request to one or more similarity detection services 136. In various examples, the request to initiate the response verification event can include the location addresses to each of the stored provider responses 127 in the decentralized storage system 133.

At block 518, the distributed agent 118 determines if one or more accurate responses 109 are received from the one or more similarity detection services 136. If a response has not been received from the one or more similarity detection service 136, the distributed agent 118 proceeds to block 521 and notifies the client application 115 that an accurate response 109 could not be determined. Otherwise, the distributed agent 118 proceeds to block 524, and the distributed agent 118 transmits the one or more accurate responses 109 to the client application 115. Thereafter, this portion of the process proceeds to completion.

Figure 6:
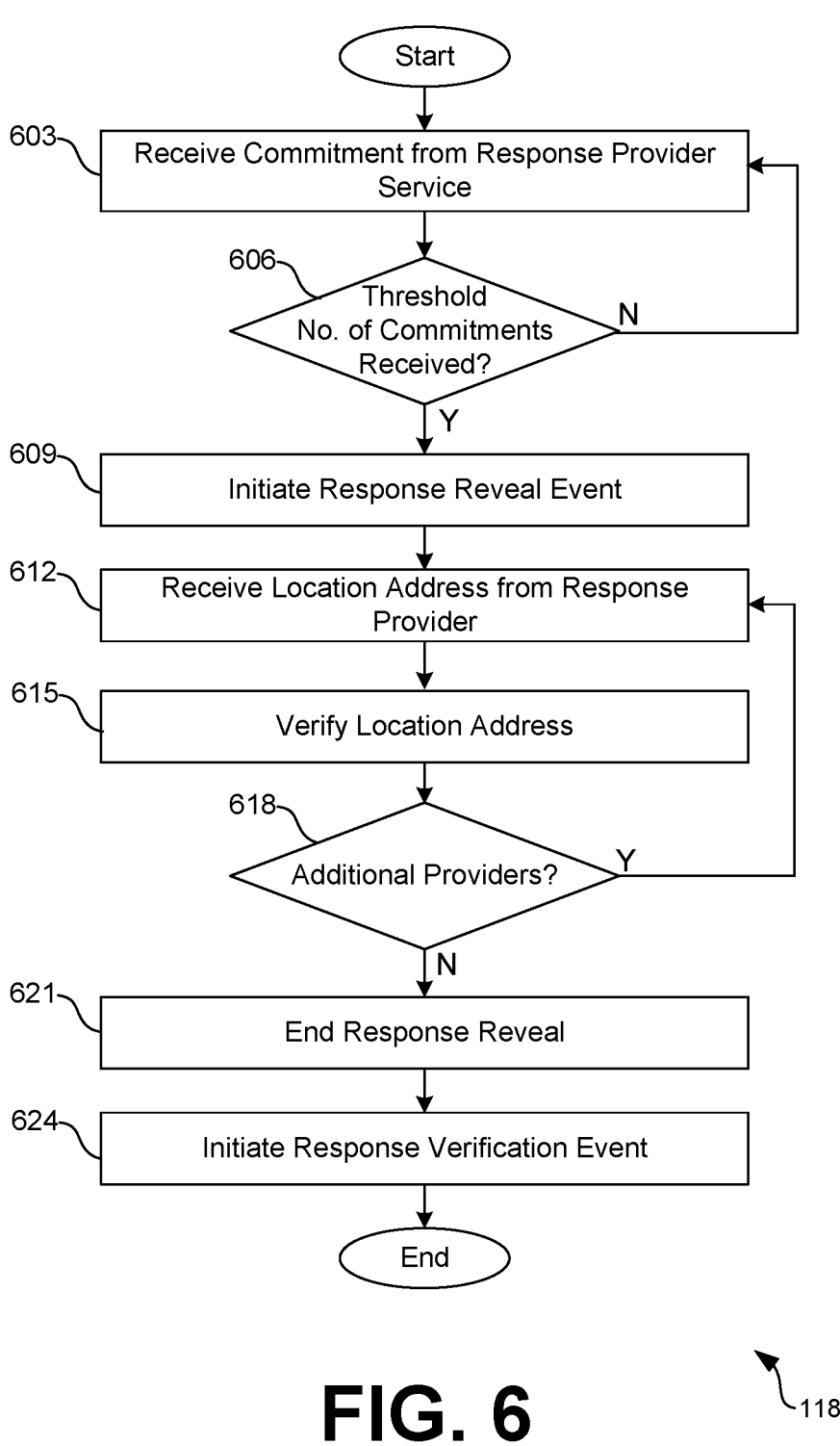

Turning now to FIG. 6, shown is a flowchart that provides one example of the operation of a portion of the distributed agent 118. The flowchart of FIG. 6 provides merely an example of the many different types of functional arrangements that can be employed to implement the operation of the depicted portion of the distributed agent 118. As an alternative, the flowchart of FIG. 6 can be viewed as depicting an example of elements of a method implemented within the network environment 200.

Beginning with block 603, the distributed agent 118 receives a commitment 134 from a response provider service 212. For example, the provider service 212 can generate a commitment 134 comprising a cryptographic indication that that the LLM service provider 124 has generated the provider response 127 and transmitted the provider response

127 to the decentralized storage system 133 for storage while keeping the value hidden or secret from others. In various examples, the provider service 212 can receive the commitment 134 over the network 209, via a notification, an API call, and/or other means of communication.

At block 606, the distributed agent 118 determines whether a threshold number of commitments 134 have been received. For example, if the distributed agent 118 requires at least four responses to be evaluated for a given prompt 112, the threshold number can be four and the threshold number of commitments 134 received needs to meet or exceed four. If the threshold number of commitments 134 have been received, the distributed agent 118 proceeds to block 609. Otherwise, the distributed agent 118 returns to block 603.

At block 609, the distributed agent 118 initiates the response reveal event. A response reveal event can comprise a request for all provider services 212 who have provided a commitment 134 to provide the location address of the provider response 127 and the commitment identifier to the distributed agent 118.

At block 612, the distributed agent 118 receives the location address and the commitment identifier from a provider service 212 associated with the response reveal event. For example, if the provider service 212 has previously submitted a commitment 134 to the distributed agent 118, the provider service 212 will then reveal the location address and the commitment identifier to the distributed agent 118 by transmitting the location address and the commitment identifier to the distributed agent 118.

At block 615, the distributed agent 118 verifies the location address of the provider response 127 associated with the provider service 212. For example, the distributed agent 118 can verify the commitment 134 provided by the provider service 212 based at least in part on can the location address associated with the stored provider response 127 and the commitment identifier provided by the provider service 212. The commitment 134 can be verified using a commitment scheme (e.g., Pederson commitment).

At 618, the distributed agent 118 determines if there are additional LLM service providers 124. If there are additional LLM service providers 124 who have not sent the location address and commitment identifier to the distributed agent 118, the distribute agent returns to block 612. Otherwise, the distributed agent 118 proceeds to block 621 and ends the response reveal.

At block 624, the distributed agent 118 initiates a response verification event. The response verification event can be initiated by sending a request or executing a function to send the request to one or more similarity detection services 136. In various examples, the request to initiate the response verification event can include the location addresses to each of the stored provider responses 127 in the decentralized storage system 133. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203, 206.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a prompt from a client device;
initiate a prompt event by notifying a plurality of response provider computing devices of the prompt;
receive a plurality of commitments and a plurality of location addresses from the at least the portion of the plurality of response provider computing devices, individual location addresses of the plurality of location addresses corresponding to a respective response location in a decentralized storage of a respective response generated by a response provider computing device of the plurality of response provider computing devices;
determine that a threshold number of a plurality of responses to the prompt have been transmitted to the decentralized storage based at least in part on a number of the plurality of commitments received;
identify an accurate response from the threshold number of the plurality of responses based at least in part on analyzing the plurality of responses, identifying any potential hallucination responses, and discarding the potential hallucination responses; and
transmit the accurate response to the client device.

2. The system of claim 1, wherein individual responses of the plurality of responses correspond to an output of a respective large language model associated with a respective response provider computing device of the plurality of response provider computing devices.

3. The system of claim 1, wherein the machine-readable instructions further cause the computing device to at least:
generate a prompt identifier in response to receiving the prompt from the client device; and
update a private mapping to associate the prompt identifier with the prompt.

4. The system of claim 1, wherein the machine-readable instructions further cause the computing device to at least verify the plurality of commitments based at least in part on a commitment scheme and the plurality of location addresses.

5. The system of claim 1, wherein the machine-readable instructions further cause the computing device to at least send a request to a verifier computing device to verify the plurality of responses stored in the decentralized storage, the request comprising the plurality of location addresses.

6. The system of claim 5, wherein the machine-readable instructions further cause the computing device to at least receive a verified response from the verifier computing device, the verified response based at least in part on a level of similarity with other responses of the plurality of responses, the accurate response being identified based at least in part on the verified response.

7. The system of claim 1, wherein the accurate response comprises an aggregate of a set of the plurality of responses being within a threshold level of similarity with one another.

8. A non-transitory, computer-readable medium, comprising machine-readable instructions that, when executed by a processor of a first computing device, cause the first computing device to at least:

receive a notification of a response verification event from a second computing device, the notification comprising a plurality of location addresses corresponding to a plurality of responses to a prompt, individual location addresses of the plurality of location addresses corresponding to a respective response location in a decentralized storage of a respective response generated by a response provider computing device of a plurality of response provider computing devices associated with generating the plurality of responses;

obtain the plurality of responses from a decentralized storage system based at least in part on the plurality of location addresses;

compare the plurality of responses to determine a similarity between the plurality of responses;

identify at least one response from the plurality of responses based at least in part on the similarity, an identification of any potential hallucination responses, and a removal of the potential hallucination responses; and provide the at least one response of the plurality of responses to the second computing device.

9. The non-transitory, computer-readable medium of claim 8, wherein the machine-readable instructions, when executed by the processor, further cause the first computing device to at least:

convert the plurality of responses into a plurality of vector embeddings; and apply the plurality of vector embeddings to a similarity model, the at least one response being identified based at least in part on an output of the similarity model.

10. The non-transitory, computer-readable medium of claim 9, wherein the machine-readable instructions, when executed by the processor, further cause the first computing device to at least calculate a Euclidean distance between individual responses of the plurality of responses based at in part on the output of the similarity model, the Euclidean distance associated with the at least one response being within a threshold value.

11. The non-transitory, computer-readable medium of claim 8, wherein the machine-readable instructions, when executed by the processor, further cause the first computing device to at least:

apply the plurality of responses to a large language model trained to identify similarities, the at least one response being identified based at least in part on an output of the large language model.

12. The non-transitory, computer-readable medium of claim 11, wherein, the large language model is trained to:

capture a plurality of hidden states of the plurality of responses;

compare the plurality of hidden states; and discard any responses of the plurality of responses that have a non-matching hidden state.

13. The non-transitory, computer-readable medium of claim 8, wherein the machine-readable instructions, when executed by the processor, further cause the first computing device to at least: generate a plurality of similarity scores based at least in part on comparing the plurality of responses, the at least one response being identified based at least in part on a respective similarity score associated with the at least one response.

14. The non-transitory, computer-readable medium of claim 13, wherein the at least one response comprises at least two responses selected from the plurality of responses based at least in part on the respective similarity score of the at least two responses meeting or exceeding a similarity threshold score.

15. A method, comprising:

receiving a prompt from a client device;

initiating a prompt event by notifying a plurality of response provider computing devices of the prompt;

receiving a plurality of commitments and a plurality of location addresses from the at least the portion of the plurality of response provider computing devices, individual location addresses of the plurality of location addresses corresponding to a respective response location in a decentralized storage of a respective response generated by a response provider computing device of the plurality of response provider computing devices;

determining that a threshold number of a plurality of responses to the prompt have been transmitted to the decentralized storage based at least in part on a number of the plurality of commitments received;

identifying an accurate response from the threshold number of the plurality of responses based at least in part on analyzing the plurality of responses, identifying any potential hallucination responses, and discarding the potential hallucination responses; and transmitting the accurate response to the client device.

16. The method of claim 15, wherein individual responses of the plurality of responses correspond to an output of a respective large language model associated with a respective response provider computing device of the plurality of response provider computing devices.

17. The method of claim 15, further comprising:

generating a prompt identifier in response to receiving the prompt from the client device; and updating a private mapping to associate the prompt identifier with the prompt.

18. The method of claim 15, further comprising verifying the plurality of commitments based at least in part on a commitment scheme and the plurality of location addresses.

19. The method of claim 15, further comprising sending a request to a verifier computing device to verify the plurality of responses stored in the decentralized storage, the request comprising the plurality of location addresses.

20. The method of claim 19, further comprising receiving a verified response from the verifier computing device, the verified response based at least in part on a level of similarity with other responses of the plurality of responses, the accurate response being identified based at least in part on the verified response.

* * * * *